United States Patent
Herman et al.

(10) Patent No.: US 9,902,423 B2
(45) Date of Patent: Feb. 27, 2018

(54) METHOD FOR IMPROVING THE STEERING RESPONSE IN MOTOR VEHICLES WITH SUPERIMPOSED STEERING SYSTEM AT THE FRONT AXLE

(71) Applicant: AUDI AG, Ingolstadt (DE)

(72) Inventors: Jakob Herman, München (DE); Johannes Agostini, Reichertshofen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/132,949

(22) Filed: Apr. 19, 2016

(65) Prior Publication Data
US 2016/0304121 A1    Oct. 20, 2016

(30) Foreign Application Priority Data
Apr. 20, 2015   (DE) .......................... 10 2015 005 023

(51) Int. Cl.
*B62D 6/08*    (2006.01)
*B62D 6/00*    (2006.01)
*B62D 5/00*    (2006.01)

(52) U.S. Cl.
CPC ............. *B62D 6/002* (2013.01); *B62D 5/008* (2013.01)

(58) Field of Classification Search
CPC ...... B62D 15/0285; B62D 11/18; B62D 6/08; B62D 6/02; B62D 6/00; B62D 5/04;
(Continued)

(56) References Cited

U.S. PATENT DOCUMENTS 2,585,790 A * 2/1952 Kelley ................... B62D 11/10
                                                   180/315
4,334,221 A * 6/1982 Rosenhagen .......... A63H 30/04
                                                    180/167
(Continued)

FOREIGN PATENT DOCUMENTS

CN    1477012 A    2/2004
CN    1765669 A    5/2006
(Continued)

OTHER PUBLICATIONS

Chinese Search Report dated Sep. 22, 2017 with respect to counterpart Chinese patent application 2016102452587.
(Continued)

*Primary Examiner* — Anne M Antonucci
*Assistant Examiner* — Sanjeev Malhotra
(74) *Attorney, Agent, or Firm* — Henry M. Feiereisen LLC

(57) ABSTRACT

A method for operating a steering system of a motor vehicle includes controlling with a control device a superimposition gearing of a superimposition steering of a front axle of the motor vehicle via an actuator so as to impose via the superimposition gearing a superimposition angle on a steering angle of a steering wheel of the motor vehicle as a function of a speed of the motor vehicle and of the steering angle of the steering wheel, wherein within a predetermined angular range of the steering wheel measured from a position of the steering wheel during a neutral straight ahead drive with neutral superimposition angle, the superimposition angle is positive resulting in a direct steering response; and wherein outside the predetermined angular range the superimposition angle is negative resulting in an indirect steering response.

16 Claims, 2 Drawing Sheets

(58) Field of Classification Search
CPC ........ B62D 6/003; B62D 5/008; B62D 9/002;
B62D 15/0275; B62D 15/028; B62D
15/0295; A63H 30/04; B60Q 1/34; B60Q
1/346; B60T 2201/10; B60T 2201/12;
B60T 2260/02; B60T 8/1755; B60W
30/02; B60W 30/045; B60W 30/18145;
B60W 40/114; B60W 40/12; B63H 25/10
USPC ............ 701/41, 70; 702/145; 180/6.44, 167,
180/204, 315, 444; 475/18, 24; 340/435
See application file for complete search history.

(56) References Cited

U.S. PATENT DOCUMENTS

| | | | | |
|---|---|---|---|---|
| 4,345,488 | A * | 8/1982 | Reed | B62D 11/18 475/24 |
| 4,428,445 | A * | 1/1984 | Zaunberger | B62D 11/18 180/6.44 |
| 5,205,371 | A * | 4/1993 | Karnopp | B62D 5/008 180/444 |
| 6,342,021 | B1 * | 1/2002 | Gleasman | B63H 25/10 475/18 |
| 2005/0137772 | A1 * | 6/2005 | Smakman | B60T 8/1755 701/70 |
| 2005/0236201 | A1 * | 10/2005 | Spannheimer | B62D 15/0285 180/204 |
| 2006/0022810 | A1 * | 2/2006 | Inoue | B60Q 1/484 340/435 |
| 2007/0203627 | A1 | 8/2007 | Bolzmann et al. | |
| 2015/0073665 | A1 * | 3/2015 | Mizuno | B60Q 1/425 701/41 |
| 2015/0120143 | A1 * | 4/2015 | Schlichting | B62D 13/06 701/41 |
| 2015/0291156 | A1 * | 10/2015 | Yokota | B60W 40/12 702/145 |

FOREIGN PATENT DOCUMENTS

| | | |
|---|---|---|
| CN | 102686473 A | 9/2012 |
| CN | 102958784 A | 3/2013 |
| CN | 103921835 A | 7/2014 |
| DE | 197 51 137 A1 | 9/1998 |
| DE | 101 26 424 A1 | 12/2002 |
| DE | 103 53 083 A1 | 6/2005 |
| DE | 2006 008 156 A1 | 8/2007 |
| DE | 2011 121 611 A1 | 9/2012 |
| WO | WO 2014/108144 A | 7/2014 |

OTHER PUBLICATIONS

Translation of Chinese Search Report dated Sep. 22, 2017 with respect to counterpart Chinese patent application 2016102452587.

* cited by examiner

METHOD FOR IMPROVING THE STEERING RESPONSE IN MOTOR VEHICLES WITH SUPERIMPOSED STEERING SYSTEM AT THE FRONT AXLE

CROSS-REFERENCES TO RELATED APPLICATIONS

This application claims the priority of German Patent Application, Serial No. 10 2015 005 023.0, filed Apr. 20, 2015, pursuant to 35 U.S.C. 119(a)-(d), the content of which is incorporated herein by reference in its entirety as if fully set forth herein.

BACKGROUND OF THE INVENTION

The present invention relates to a method for improving the steering response in motor vehicles with superimposed steering system at the front axle, wherein the superimposed steering system includes a superimposed transmission and wherein, controlled by a control device, a superimposed steering angle is imposed by means of the superimposition gearing on the steering wheel angle resulting from the actuation of the steering wheel, which superimposed steering angle increases or decreases the steering angle depending on at least the measured speed of the motor vehicle.

The following discussion of related art is provided to assist the reader in understanding the advantages of the invention, and is not to be construed as an admission that this related art is prior art to this invention.

The recent past has seen numerous proposals to use active front axle steering systems in motor vehicles. These enable a steering intervention on the front axle independent of the steering wheel angle. In standard motor vehicles available to date so-called superimposition steering systems are installed because these ensure in the case of failure of the electronic system the steerability via the mechanical connection between steering wheel and steering gear. In this special type of active steering an angle is superimposed on, i.e., imposed on a steering wheel angle that is set by a steering wheel. The steering angle at the output of the steering gear then no longer corresponds to the angle set by the steering wheel. This measure on one hand enables a stepless adjustment of the steering gear so that for example a direct transmission ratio can be set for maneuvering at slow speeds, which requires fewer turns of the steering wheel during parking, while during driving on the highway an indirect transmission ratio can be set which renders control over the vehicle more sensitive. On the other hand a superimposition also enables fast driving dynamics interventions. This means that during the drive, to the most degree independent of steering interventions by the driver, the wheel angle can be changed which enables a fast responding regulation of the driving dynamics.

In superimposition steering systems it is known to use measuring values, vehicle parameters and vehicle specific variables for determining the steering ratio or the transmission ratio that actually has to be adjusted. This includes in particular the actual vehicle speed and the actual steering wheel angle. Using these variables the steering ratio is determined with a model, a characteristic curve or a characteristic field, from which steering ratio in turn a superimposition angle for the superimposition gearing can be determined. The superimposition angle is applied by controlling an actuator for example an electric motor, which sets the superimposition angle at the superimposition gearing.

Known are superimposition steering systems of the type described above for example from DE 197 51 137 A1. This reference relates to a steering system for a motor vehicle with a steering drive train, in which at least one steerable wheel, an actuating drive and a superimposition gearing and the steering wheel which can be actuated by the driver of the vehicle and also mechanical deflection means are arranged.

In DE 10 2006 008 156 A1 a method for determining the steering transmission ratio of a vehicle is described, wherein during a stable drive of the vehicle the steering transmission ratio is determined from detected measurement values by taking vehicle parameters into account.

A common feature of the state of the art is that due to the increasingly indirect steering transmission, the steering response of the motor vehicle starting from the neutral straight ahead drive deteriorates in particular in the mid to upper speed range insofar as a turning of the steering wheel only results in a small steering reaction at the steered wheels. The steering response thus becomes increasingly indirect with increasing vehicle speed and causes a "fuzzy" steering experience in particular in the range about the neutral center position of the steering wheel.

SUMMARY OF THE INVENTION

It would therefore be desirable and advantageous to provide a method which in motor vehicles with superimposition steering system enables to resolve the conflict between a deteriorating steering response but higher stability which results in known steering systems at increasing speeds of the motor vehicle as a result of the increasingly indirect steering transmission.

According to one aspect of the present invention, a method for operating a steering system of a motor vehicle, comprising: controlling with a control device a superimposition gearing of a superimposition steering of a front axle of the motor vehicle via an actuator so as to impose via the superimposition gearing a superimposition angle on a steering angle of a steering wheel of the motor vehicle as a function of a speed of the motor vehicle and of the steering angle of the steering wheel, wherein within a predetermined angular range of the steering wheel measured from a position of the steering wheel during a neutral straight ahead drive with neutral superimposition angle, the superimposition angle is positive resulting in a direct steering response; and wherein outside the predetermined angular range the superimposition angle is negative resulting in an indirect steering response. This advantageously achieves that the steering out of the neutral straight ahead drive a continuously direct steering feeling is provided at increasing speed, at the same time the narrow limitation of the angular range and the indirectness of the steering wheel transmission which is initiated beyond this angular range and increases with increasing steering wheel angle a so called "excessive" steering is prevented to the most degree.

According to another advantageous feature of the invention, the method further includes determining with the control device the predetermined angular range as a function of the speed of the motor vehicle, wherein establishing a respective steering initiation range in respective right and left steering directions, measured from the neutral straight ahead drive position of the steering wheel; and generating with the control device via the actuator the positive superimposition angle in dependence on the steering wheel angle so that within the respective steering initiation range starting from a steering wheel angle of 0° a curve course of the positive superimposition angle includes for all speeds of at least one predetermined speed range a first region in which the positive superimposition angle increases, a maximum and adjoining the maximum a second region in which the positive superimposition angle decreases to 0°, wherein a height and a position of the maximum is a function of the speed; and generating with the control device via the actuator the superimposition angle in dependence on the steering wheel angle so that in a respective angular range of the steering wheel adjoining the respective steering initiation range, the superimposition angle becomes negative with overcoming the respective steering initiation range and decrease preferably steadily with increasing steering wheel angle up to a maximal steering wheel angle. This described course of the superimposition angle is advantageous for conveying a comfortable steering feeling.

The steering initiation range hereby includes respectively an angular range, measured from the neutral straight ahead drive position of the steering wheel (steering wheel angle "0°") in each of the two steering directions, which angular range is preferably less than a tenth of the respective maximal steering wheel angle in each of the two steering directions. The speed dependent definition of the steering initiation range in particular enables decreasing this range with increasing speeds thus making oversteering at least harder.

As a result of this measure the steering response can be optimally adjusted for each motor vehicle type to each speed. In order to be able to also convey a comfortable steering feeling outside the respective steering initiation range and to at least make the already mentioned oversteering harder a steering wheel angular range adjoins the steering initiation range—respectively in both steering directions—in which the control device generates superimposition angles in dependence on the steering wheel angle, so that the superimposition angles become negative and preferably decrease steadily with increasing steering wheel angle up to the maximal steering wheel angle.

According to another advantageous feature of the invention, the steering initiation range can be smaller than 30°, preferably smaller than 20°, most preferably smaller than 15°, respectively from the neutral center position of the steering wheel.

In order to make the steering response adjustable to different driver demands it can advantageously be provided that the steering wheel dependent curve course of the superimposition angle can be increased and/or lowered at least within predetermined limits by adding an offset. In this way different steering responses that are selectable by the driver can be easily realized for a given vehicle type for example by switching means that are accessible to the driver. The term "offset" is to be understood very generally. It is for example advantageous to provide a plurality of tables which are respectively assigned to vehicle speeds, wherein the table values vary in dependence on the steering wheel angle, so that speed-dependent and steering-wheel-angle dependent offset values are available. Of course also a mathematical model can be provided from which speed-dependent and steering-wheel-angle dependent offset values can be calculated.

In motor vehicles on the market to date a rear axle steering can be provided beside the superimposition steering at the front axle. In such all-wheel steering systems it is advantageous to define steering initiation ranges for these steering systems, wherein within the steering initiation ranges the yaw reaction of the motor vehicle is enhanced by an additional factor in dependence on the actual steering wheel angle and the actual speed of the motor vehicle. This is achieved by corresponding increase of the enhancing factors for the yaw rate.

Also for all-wheel steering systems it is advantageous to define the steering initiation range smaller than 30°, preferably smaller than 20°, most preferably smaller than 15°.

In order to limit the costs for all-wheel steering systems the enhancement is increased linearly or is increased with a PT1-behavior in dependence on the steering wheel angle for at least one predeterminable speed range up to a predetermined maximum. Correspondingly the enhancement is canceled linearly or with a POT1-behavior when the steering wheel angle increases and the predetermined maximum is exceeded.

Also in the case of an all-wheel steering system it can advantageously be provided for adjustment of the steering response that the enhancement is made increasable and/or decreasable at least within the steering initiation range by adding an offset within predetermined limits by input from the drive for example by means of switching means.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
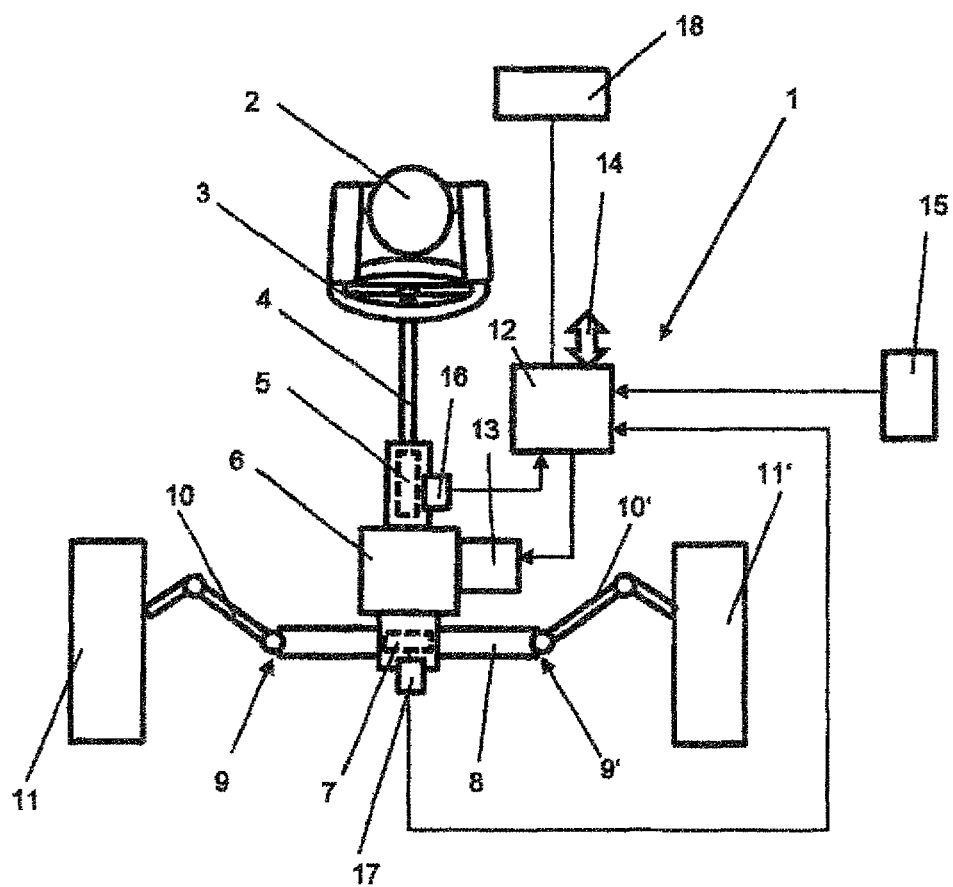
FIG. 1 is a schematic representation of a superimposition steering system.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1 there is shown a schematic representation of a superimposition steering system 1 arranged in a motor vehicle. The steering movements of the driver 2 are transmitted via the steering wheel 3 and the steering column 4 to a torsion bar 5 and the superimposition gearing 6. On the output side of the superimposition gearing 6 a pinion 7 is arranged which acts on a steering rack 8 both ends 9, 9' of which are connected with the two steerable front wheels 11, 11' via steering linkages 10, 10'.

For controlling the superimposition gearing 6 a control device 12 is provided which acts on the superimposition gearing 6 via an actuator 13, for example an electric motor, and sets the correct superimposition angle with regard to the driving dynamic parameter and the steering wheel angle. In the present example the driving dynamics parameter is the vehicle speed and the steering wheel angle. For controlling the superimposition angle the control device 12 has on one hand access to the actual vehicle speed via a bus system 14, which vehicle speed is obtained via sensors (not shown) arranged in the motor vehicle. On the other hand information regarding the actual vehicle speed and the actual steering wheel angle is stored in a memory 15 accessible to the control device 12, with which information superimposition angle, which is appropriate for the actual speed and the actual steering wheel angle can be determined. The term information is understood very generally and may be a mathematical steering model from which the superimposition angle can be calculated for defined vehicle speeds and steering wheel angles or it may include stored tables of interpolation values for steering curves. In the latter case a plurality of tables are respectively stored for discrete vehicle speeds from which tables on one hand a table is selected and on the other hand an interpolation value form the table by means of the steering wheel angle. When the actual vehicle speed is present for the tables between two vehicle speeds, an interpolation between the steering wheel angle dependent interpolation values from both tables is performed, the same applies when the steering wheel angle lies between two interpolation values.

For determining the steering wheel angle a steering wheel angle sensor 16 is arranged on the steering wheel side input of the superimposition gearing 6, while the feedback regarding the actually set steering wheel output angle via the superimposition gearing 6 is accomplished via a rotary angle sensor 17. In both cases a coded incremental rotary encoder is used which senses the direction of rotation as well as the angle of rotation. The steering wheel sensor 16 and the rotary sensor 17 can be queried by the control device 12.

Further provided is a switching device 18 which acts on the control device 12 and with which the driver can select a desired steering initiation behavior. The switching device 18 can be a switch or a menu on a monitor.

The control device 12 does not have to be a hardware device which is provided especially for this purpose, but rather it is common nowadays to execute many different control sequences quasi parallel in processing units by means of control routines, i.e., to form a control device temporarily ion a processing unit by means of a control program. The description above and below is meant to be understood in this context.

Figure 2:
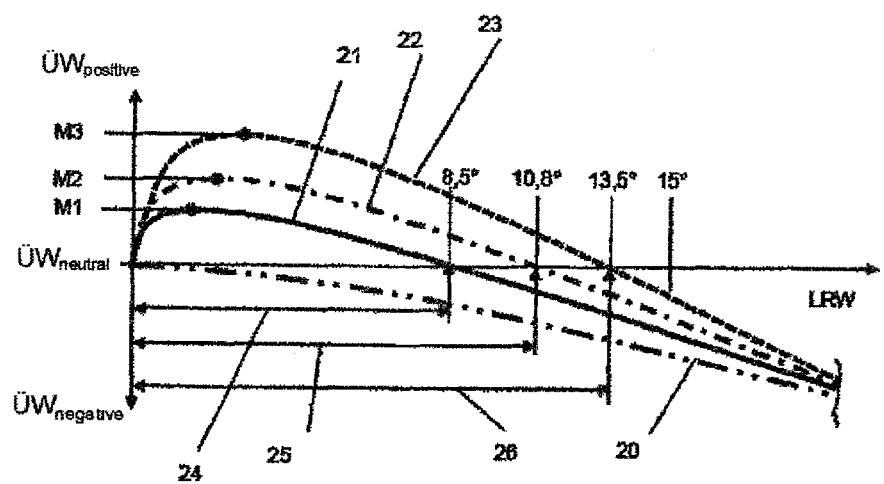
FIG. 2 is a schematic representation of steering curves in steering direction towards the right.

In order to illustrate how the method for improving the steering response in motor vehicles with a superimposition steering system operates, reference is first made to the steering curve representation in FIG. 2. There steering curves 20 to 23 are shown in a coordinate system, on the ordinate the steering wheel angle LWR is plotted, for reason of simplicity only the steering wheel angle LWR to the right, starting with the steering wheel angle "0°". The abscissa shows the values of the superimposition angle ÜW, which result from the steering curves 20 to 23. In this case the reference is the neutral superimposition angle UW neutral, which as mentioned is "0" and is situated in the origin of the coordinate system. The steering curve 20 shows the steering behavior of the control unit 12 (FIG. 1) up the current time point with regard to the superimposition angle ÜW at a first assumed vehicle speed. For better illustration this first assumed vehicle speed is 80 km/h. according to the goal that at higher vehicle speeds an indirect steering behavior is intended to prevent braking out of the motor vehicle due to vigorous steering movements, a negative superimposition angle $ÜW_{negative}$ is used starting with the steering angle "0°" which negative superimposition angle further steadily decreases with increasing steering angle LRW, i.e., assumes higher negative values. As a result of the effect of the superimposition gearing the negative superimposition angle $ÜEW_{negative}$ is added to the steering angle LRW so that the steering behavior starting from the steering angle "0°" becomes increasingly indirect. At great steering wheel angles LRW this behavior is actually desired, in the case of small steering wheel angles LRW on the other hand the drive notices an insufficient steering response. In order to remedy this circumstance the method according to the invention provides to define vehicle speed dependent steering initiation ranges 24, 25, 26 within a predefined speed range and to use positive superimposition angles ÜW positive relative to the neutral superimposition angle $ÜW_{neutral}$ in these steering initiation ranges 24, 25, 26, wherein the values of the positive superimposition angles $ÜW_{positive}$ are speed dependent as well as steering wheel angle dependent. In order to enable a direct comparison FIG. 2 also shows for the first assumed vehicle speed 80 km/h a second steering curve 22. Hereby a first steering initiation range 25 is defined which extends from the steering wheel angle 0° to the steering wheel angle 10.8°. In case of steering angles within this first steering initiation range 25 the control information for a positive superimposition angle $ÜW_{positive}$ is generated by the control device 12 (FIG. 1) and the actuator 13 (FIG. 1) is controlled with this control information so that a positive superimposition angle $ÜW_{positive}$ is superimposed over the steering wheel angle LRW. As a result of the superimposition of the positive superimposition angle $ÜW_{positive}$ the steering response out of the steering angle "0°" becomes more direct. According to the second steering curve 22 the steering wheel angle dependent course of the superimposition angle values is configured so that first the superimposition angle values increase with increasing steering wheel angle LRW until a maximum MW is reached and then decrease again with increasing steering wheel angle LRW until at the end of the steering initiation range 25 the superimposition angle again equals the neutral superimposition angle $ÜW_{neutral}$, i.e., "0°". When the steering wheel angle LRW further increases the superimposition angle is negative again and the course of the second steering curve 22 approximates the course of the first steering curve 20.

As mentioned above the superimposition angle UW is dependent on the vehicle speed. In order to illustrate this fact a third steering curve 21 and a fourth steering curve 23 are shown in FIG. 2. The third steering curve 21 shows conditions at an assumed speed of 150 km/h. the course of the third curve 21 is similar to the second steering curve 22 and only differs regarding the smaller maximum M1 for the positive superimposition angle $ÜW_{positive}$ and the smaller second steering initiation range 24, which already ends at a steering wheel angle of 8.5°. The fourth steering curve 23 illustrates the conditions at lower vehicle speeds, in the example a speed of 50 km/h is assumed for the fourth steering curve 23. At such lower speeds a direct steering response is desired. This is addressed by a significantly increased maximum M3 of the positive superimposition angle $ÜW_{positive}$ and the third steering initiation range 26 is significantly greater with a steering wheel angle LRW of 13.5°.

In praxis it may be advantageous for the handling to expand the steering initiation range beyond the greater steering wheel angle LRW at slower speeds, i.e. already at the 50 km/h mentioned above. Thus, in contrast to the example used in FIGS. 2 and 3 it is quite realistic to expand the steering wheel angle LRW to a steering wheel angle LRW=80 to LRW=100 by adding a positive superimposition angle $ÜW_{positive}$. At even smaller vehicle speeds it may be advantageous for a better handling to provide a positive superimposition angle $\ddot{U}W_{positive}$ for the entire steering wheel angle LRW. In these cases strictly speaking there is no steering initiation range within the meaning of the definition.

In the example of FIG. 2 as mentioned above only the conditions in steering direction to the right are shown, of course the conditions when steering to the left are analogous, for this purpose FIG. 2 simply has to imagined mirrored at the abscissa. It is thus not necessary to describe the circumstance in the case of steering to the left again in detail, only the position of the steering initiation ranges at the steering wheel is explained with reference to FIG. 3. There the first steering initiation range 25 and the second steering initiation range 24 and the third steering initiation range 26 are shown respectively staring from the neutral position of the steering wheel at straight ahead drive extending to the right. In the direction of rotation of the steering wheel 3 toward the left the same angular ranges result as steering initiation ranges for the same speeds, they extend from the neutral position of the steering wheel 3 toward the left as illustrated by the fourth steering initiation range 25' the fifth steering initiation range 24' and the sixth steering initiation range 26'.

Figure 3:
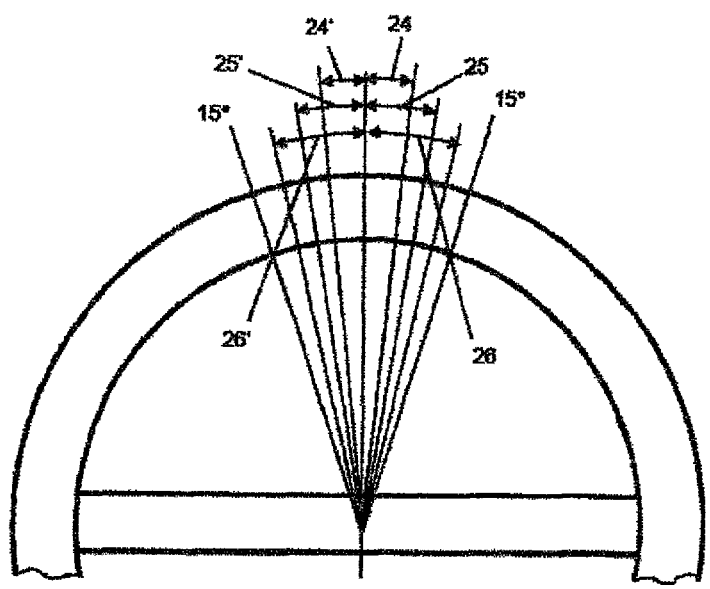
FIG. 3 is a schematic representation of a steering wheel with drawn in steering initiation ranges.

Regarding the illustrations in FIGS. 2 and 3 it is noted that the explicitly mentioned speeds and angular values only serve for explanatory purposes and in the respective realization depend on the technical conditions at the motor vehicle. Only the maximal value for all steering initiation ranges should be smaller than 30°, preferably smaller than 20°, most preferably smaller that 15° in the direction of rotation of the steering wheel measured from the neutral position of the steering wheel at straight ahead drive. At low vehicle speeds, for example 50 km/h and lower, the steering initiation range can however be selected significantly greater than 30° in favor of a better handling.

In order to further increase the comfort for the driver it can be provided that the possibility to intervene is provided for the driver for changing the steering initiation behavior, as already described in connection with FIG. 1. Thus it would be possible to provide a selection option for example between three different steering response of the motor vehicle for the driver, i.e., "sporty" "normal" and "comfort". These stage can be realized the most simple by adding of an offset value to the superimposition angle UW depending on the selected setting. Of course also three different steering models or three different sets of interpolation value tables can be provided.

In addition to the superimposition steering system the steerability of a motor vehicle may further be increased by using steered rear wheels. In such all-wheel-steering systems also speed dependent steering initiation ranges can be defined. In these steering initiation ranges the yaw reaction of the motor vehicle can be increased by an additional factor in dependence on the actual steering wheel angle and the actual speed of the motor vehicle. This is achieved with corresponding increase of the enhancement factors for the yaw rate.

Also for the rear wheel steering it is advantageous when the steering initiation range is smaller than 30°, preferably smaller than 20°, most preferably smaller than 15°. Also in this case the steering initiation range can be selected significantly greater than 30° at smaller vehicle speeds, for example 50 km/h and smaller, in favor of a better handling.

In order to reduce the complexity of the rear wheel steering the enhancement is increased linearly or with a PT1-behavior for at least one predeterminable speed range in dependence on speed and steering wheel angle up to a predetermined maximum. Correspondingly the enhancement is decreased linearly or with a PT1-behavior when the steering angle increases and the predetermined maximum is exceeded.

Also in the case of an additional rear wheel steering an intervention possibility can be provided analogous to the switching device 18 (FIG. 2) for adjusting the steering response to the demands of the driver, which makes the enhancement, at least within the steering initiation range increasable and/or decreasable by adding an offset. The statements regarding the term offset apply analogously in this case.

What is claimed as new and desired to be protected by Letters Patent is set forth in the appended claims and includes equivalents of the elements recited therein:

1. A method for improving a steering response in a motor vehicle with superimposition steering system, said method comprising:
controlling with a control device a superimposition gearing of a superimposition steering of a front axle of the motor vehicle via an actuator so as to impose via the superimposition gearing a superimposition angle on a steering angle of a steering wheel of the motor vehicle as a function of a speed of the motor vehicle and of the steering angle of the steering wheel,
wherein within a predetermined angular range of the steering wheel measured from a position of the steering wheel during a neutral straight ahead drive with neutral superimposition angle, the superimposition angle is positive resulting in a direct steering response; and
wherein outside the predetermined angular range the superimposition angle is negative resulting in an indirect steering response.

2. The method of claim 1, further comprising:
determining with the control device the predetermined angular range as a function of the speed of the motor vehicle, thereby establishing a respective steering initiation range in respective right and left steering directions, measured from the neutral straight ahead drive position of the steering wheel; and
generating with the control device via the actuator the positive superimposition angle in dependence on the steering wheel angle so that within the respective steering initiation range starting from a steering wheel angle of 0 during straight ahead drive a curve course of the positive superimposition angle includes for all speeds of at least one predetermined speed range a first region in which the positive superimposition angle increases, a maximum and adjoining the maximum a second region in which the positive superimposition angle decreases to 0°, wherein a height and a position of the maximum is a function of the speed; and
generating with the control device via the actuator the superimposition angle in dependence on the steering wheel angle so that in a respective angular range of the steering wheel adjoining the respective steering initiation range, the superimposition angle becomes negative with overcoming the respective steering initiation range and decrease preferably steadily with increasing steering wheel angle up to a maximal steering wheel angle.

3. The method of claim 2, wherein the positive superimposition angle increases steadily in the first region.

4. The method of claim 2, wherein the positive superimposition angle decreases steadily to 0°.

5. The method of claim 2, wherein the superimposition angle decreases steadily up to the maximal steering wheel angle.

6. The method of claim 2, wherein the steering initiation range is smaller than 30°.

7. The method of claim 2, wherein the steering initiation range is smaller than 20°.

8. The method of claim 2, wherein the steering initiation range is smaller than 15°.

9. The method of claim 2, further comprising increasing and/or the decreasing the curve course of the superimposition angle at least within the steering initiation range by adding an offset within predetermined limits.

10. The method of claim 1, further comprising providing steered rear wheels resulting in an all-wheel steering of the motor vehicle, predetermining steering initiation ranges for the all-wheel steering and enhancing a yaw reaction of the motor vehicle by an additional factor within the steering initiation ranges by increasing enforcement factors for a yaw rate of the motor vehicle in dependence on an actual steering wheel angle and an actual speed of the motor vehicle.

11. The method of claim 10, wherein the steering initiation ranges are smaller than 30°.

12. The method of claim 10, wherein the steering initiation ranges are smaller than 20°.

13. The method of claim 10, wherein the steering initiation ranges are smaller than 15°.

14. The method of claim 10, wherein for at least one predeterminable speed range of the motor vehicle the yaw reaction is enhanced linearly or with a PT1-behavior dependent on a steering wheel angle up to a predetermined speed dependent maximum.

15. The method of claim 14, wherein at a respective increasing steering wheel angle and exceeding the predetermined speed dependent maximum the enhancing of the yaw reaction is reversed linearly or with a PT1-behavior.

16. The method of claim 14, further comprising increasing and/or decreasing the enhancing at least within the steering initiation range within predetermined limits by adding an offset.

* * * * *